(12) United States Patent
Berretty et al.

(10) Patent No.: US 7,689,031 B2
(45) Date of Patent: Mar. 30, 2010

(54) VIDEO FILTERING FOR STEREO IMAGES

(75) Inventors: Robert-Paul Mario Berretty, Eindhoven (NL); Fabian Edgar Ernst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 576 days.

(21) Appl. No.: 10/540,672

(22) PCT Filed: Dec. 24, 2003

(86) PCT No.: PCT/IB03/06214

§ 371 (c)(1),
(2), (4) Date: Jun. 24, 2005

(87) PCT Pub. No.: WO2004/059991

PCT Pub. Date: Jul. 15, 2004

(65) Prior Publication Data

US 2006/0078180 A1    Apr. 13, 2006

(30) Foreign Application Priority Data

Dec. 30, 2002 (EP) .................................. 02080580

(51) Int. Cl.
*G06K 9/00* (2006.01)
*G06T 15/40* (2006.01)
*H04N 15/00* (2006.01)
*H04N 13/00* (2006.01)

(52) U.S. Cl. .......................... 382/154; 345/421; 348/42

(58) Field of Classification Search ................ 382/154; 345/418–424, 433; 348/51, 53
See application file for complete search history.

(56) References Cited

U.S. PATENT DOCUMENTS 5,929,859 A 7/1999 Meijers
6,175,592 B1* 1/2001 Kim et al. .............. 375/240.16
6,252,608 B1* 6/2001 Snyder et al. ................ 345/473
6,256,068 B1* 7/2001 Takada et al. ................ 348/441
2002/0008697 A1* 1/2002 Deering ....................... 345/418
2002/0097241 A1* 7/2002 McCormack et al. ........ 345/423
2002/0101417 A1 8/2002 Burk et al.
2003/0016218 A1* 1/2003 Zwicker et al. .............. 345/424
2003/0151606 A1* 8/2003 Morein ........................ 345/422
2004/0150747 A1* 8/2004 Sita ............................. 348/558
2007/0206008 A1* 9/2007 Kaufman et al. ............ 345/424

OTHER PUBLICATIONS

Oliveira, "Relief Texture Mapping", ACM Press/Addison-Wesley Publishing Co, 2000, pp. 359-368 of ACM's Proceedings of the 27th annual conference on Computer graphics and interactive techniques.*

* cited by examiner

*Primary Examiner*—Bhavesh M Mehta
*Assistant Examiner*—Nathan Bloom

(57) ABSTRACT

An image processing system generates an output image from an input image through a depth-dependent transformation. The images are represented as respective pixel arrays. An input 1110 receives for each input pixel an associated input pixel value and input pixel depth. Each input pixel is associated with a respective reconstruction filter footprint. A video processor create the output pixels by, for each input pixel, transforming 1120 the input pixel to a transformed input pixel as a function of the associated input pixel depth and transforming the associated filter footprint to an transformed filter footprint as a function of the associated input pixel depth. The processor also performs a reconstruction filtering operation 1150 on a plurality of the transformed input pixels using the transformed filter footprints. An output 1160 is used for providing the output image for subsequent rendering.

4 Claims, 10 Drawing Sheets

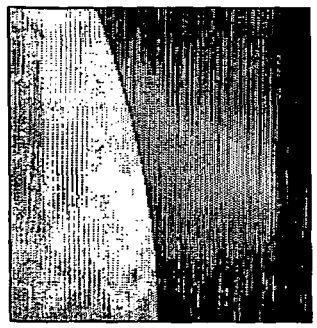
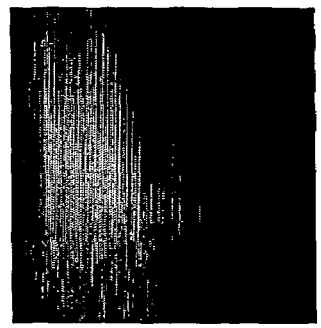
FIG.13A  FIG.13B  FIG.13C
FIG.14A  FIG.14B
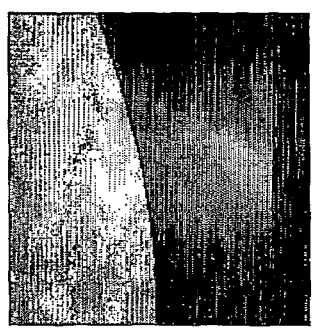
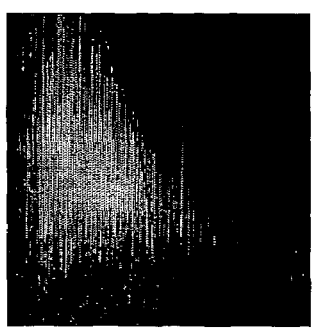
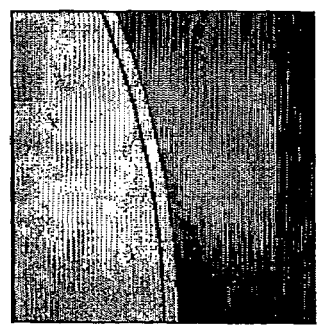
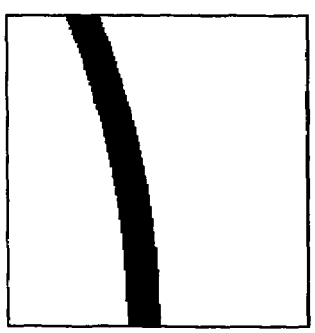
FIG.14E
FIG.14C  FIG.14D

VIDEO FILTERING FOR STEREO IMAGES

FIELD OF THE INVENTION

The invention relates to an image processing system for generating at least one output image associated with an output viewpoint from an input image associated with an input viewpoint through a depth-dependent transformation.

BACKGROUND OF THE INVENTION

The interest in providing a depth sensation when displaying an image on a 2D display is growing rapidly, notably in virtual reality applications and computer games. Various forms of providing depth cues, such as influencing the brightness level or the size of an object, are known. Particularly, stereopsis, or stereoscopic vision, receives much attention as a technique for providing depth sensation. Stereopsis is evoked by presenting to a person two 2D images of the same scene as observed from two positions a little way apart. One of the images is presented to the left eye, the other one is presented to the right eye. The two images are parallactically related. The term "parallax" refers to the apparent displacement or the difference in apparent direction of an object as seen from two different points not on a straight line with the object. Parallax allows a person to perceive the depth of objects in a scenery.

Many display techniques for displaying stereoscopic images are known. Using a time-parallel technique, both output images are presented simultaneously to one or two displays. For example, both images may be filtered with complementary colors and superimposed on one display. The observer wears glasses with filters that match the projection filters. Alternatively, both images may be displayed alongside on one display and viewed using a viewer which directs each image to the correct eye. As another example, two displays may be used to present two differently polarized pictures, which are viewed through correspondingly polarized glasses. Alternatively, both images may be presented using a head-mounted device with separate displays for each eye. Also time-multiplexed techniques may be used, where the left and right images are alternatingly displayed on one display. As an example, one image is written to the even scan lines of a monitor and the other image to the odd scan lines. A shutter system is used to occlude the left eye when the right-eye image is displayed and to occlude the right eye when the left-eye image is displayed. The shutter system may be mounted in glasses worn by the observer. Alternatively, a shutter with a controllable polarizes is placed in front of the display and the observer wears a head-mounted device with polarized glasses.

A possible video format that is suited for rendering a 2D image from different viewpoints is a 2D video format enriched with depth information. Typically, the 2D input image is given in the form of an array of pixels. It may, for instance, have been obtained using a camera or computer graphics. For each of the pixels of the input image additional depth information is available or, similarly, for each point in the scene, a distance is given of the point to the camera (or to another reference point, line or plane, such as a projection screen). Such a format is usually referred to as a 2.5D video format. The depth information allows modeling of the original image as a set of samples of a flat image, but also as a set of samples of an image projected onto a terrain. FIG. 1A shows a cross section of the sampled terrain. From the camera position a ray is cast to each pixel of the screen. The lengths of the arrows along the rays indicate the depth values of the pixel samples, also referred to as texels (texture elements). The 2.5D video format represents a subset of the full 3D model of the world. Rendering from other viewpoints can be accomplished by projecting the terrain onto the image plane from the desired viewpoint. Based on the parallax when observing the same object from the visual point of the eyes and from the camera point, the pixels of the left eye image and the right eye image can be derived from the pixels of the input image by shifting the pixels. By choosing the horizontal axis of the co-ordinate system as being parallel to the line connecting both eyes, only a horizontal shift occurs. The amount of shift of a pixel depends on the depth information. FIG. 1B shows that after viewpoint transformation, the density of the projected input pixels is not uniform in the output domain. Hence, a resampling procedure is required. Existing video processing hardware/software designed for processing broadcast video signals is able to yield high-quality output images. Such HW/SW is able to scale an image to different display formats, such as 4:3 and 16:9 and perform re-sampling and band limiting of the signal for such a conversion. The video processing occurs per horizontal scan line of the image.

SUMMARY OF THE INVENTION

It is an object of the invention to provide a video processing system and method capable of performing a viewpoint transformation without introducing visual artifacts. It is preferred that such a transformation is performed at low cost and can be integrated with existing video processing hardware/software designed for processing broadcast video signals To meet the object of the invention, an image processing system is operative to generate at least one output image associated with an output viewpoint from an input image associated with an input viewpoint through a depth-dependent transformation; the images being represented as an input pixel array and output pixel array, respectively; the image processing system including: an input for receiving the input image, where the input image includes for each input pixel an associated input pixel value and input pixel depth; each input pixel being associated with a respective reconstruction filter footprint; a video processor operative to create output pixels of the output image by:
  for each input pixel, transforming the input pixel to a transformed input pixel as a function of the associated input pixel depth and transforming the associated filter footprint to an transformed filter footprint as a function of the associated input pixel depth; and
  performing a reconstruction filtering operation on a plurality of the transformed input pixels using the transformed filter footprints; and an output for providing the output image for subsequent rendering According to the invention, each input pixel is associated with an initial filter footprint, which may for example correspond to the length of the pixel. This filter footprint is transformed based on the pixel depth. This transformation is typically a parallactic transformation from an input viewpoint to an output viewpoint. The transformation not only shifts the input pixels, but also changes the size of the filter footprint (e.g. stretches or shrinks the footprint). Consequently, after the transformation the footprints may partly or completely overlap. Consequently, input pixels nearer the viewpoint may partly or completely overlap input pixels further removed from the viewpoint. The transformed input pixels will also in general no longer be aligned according to the output pixel grid (represented as an array). The output pixels are reconstructed based on the transformed input pixel footprints. Existing video reconstruction filters, designed for dealing with different image ratios, are able to reconstruct an output signal using stretched or shrunken footprints. Such existing filters may be used, fed by filter footprint sizes determined by the depth dependent transformation.

According to the measure of the dependent claim 2, the processor determines which transformed filter footprints are not fully-occluded from the output viewpoint. It uses these footprints for the reconstruction filtering. By using only the fully visible footprints speed is increased.

According to the measure of the dependent claim 3, also partly occluded footprints are used, proportional to the part that is visible. This increases the quality of the output image.

According to the measure of the dependent claim 4, fully occluded footprints are eliminated from the filtering and do not contribute to the output signal.

According to the measure of the dependent claim 5, sequentially processing the pixels per row in a direction opposite a displacement from the input viewpoint to the output viewpoint makes is easy to detect occlusion. This can be done by maintaining a one dimensional extent indicating a furthest x-coordinate of the pixels and their footprints that have been transformed so far. If the transformation of the next footprint results in increasing the extent the transformed next footprint is at least partly not occluded. In this way it can be decided easily whether or not to exclude a pixel from the filtering. Preferably, the x-axis is horizontal and the camera displacement also. If so desired, other directions are possible as well.

According to the measure of the dependent claim 6, also a hidden image can be received, where the hidden image includes for each hidden pixel an associated hidden pixel value and hidden pixel depth. The video processor can determine whether or not an output pixel is de-occluded from the output viewpoint and performs for a de-occluded output pixel perform the reconstruction filtering on a transformed hidden image pixel. So, holes that appear in the input image after transformation are filled with pixel from the hidden image. These hidden image pixel are processed (transformed and filtered) as if they had been taken from the input image. Preferably, the hidden image is formed of several hidden layers.

According to the measure of the dependent claim 7, the video processor is operative to determine that an output pixel is de-occluded if the transformed input pixel increases the x-coordinate extent by more than a predetermined threshold. Preferably, if the x-coordinate of the input pixel after transformation is removed more than 1.5 pixels from the last pixel position in the output image, the hole is too big and is filled with information from the hidden layer.

According to the measure of the dependent claim 8, preferably the reconstruction filter is based on a box filter or a higher order filter.

According to the measure of the dependent claim 9, the reconstructed signal is pre-filtered before rendering. The pre-filter has a defined foot-print for each output pixel. If this footprint overlaps with the transformed reconstruction filter footprint of an input pixel, this input pixel contributes to the value of the output pixel. The contribution is weighted according to the pre-filter shape. Such a resampling procedure is known as forward texture mapping, or texel splatting. Texel splatting can be integrated easily with higher order filters. The drawback of the conventional texel splatting is the hard integration with handling occlusions. Conventionally, the forward texture mapping approach handles occlusions by using a fragment buffer that stores contributions for an output pixel, together with the depth information. The buffer accumulates the contributions of the entire scene, and sorts them from front to back. After processing the whole scene, the buffer can be used to render the scene front to back. The drawback of this approach is that the size of the fragment buffer is proportional to the area of the footprint of the video filter times the size of the output image. Using the approach according to the invention, no fragment buffer is required making it easier to apply high order filtering.

According to the measure of the dependent claim 10, the pre-filter preferably only operates horizontally, enabling in a simple sequential processing of pixels and matching well with current video processing in televisions. To achieve higher quality, the pre-filter may extend to more than one row of pixels.

These and other aspects of the invention are apparent from and will be elucidated with reference to the embodiments described hereinafter.

BRIEF DESCRIPTION OF THE DRAWINGS

In the drawings:

FIG. 13 illustrates that holes may appear after the depth-dependent transformation of a 2.5D base image;

FIG. 14 shows filling of the holes using a hidden layer;

DETAILED DESCRIPTION OF THE PREFERRED EMBODIMENT

Figure 1:
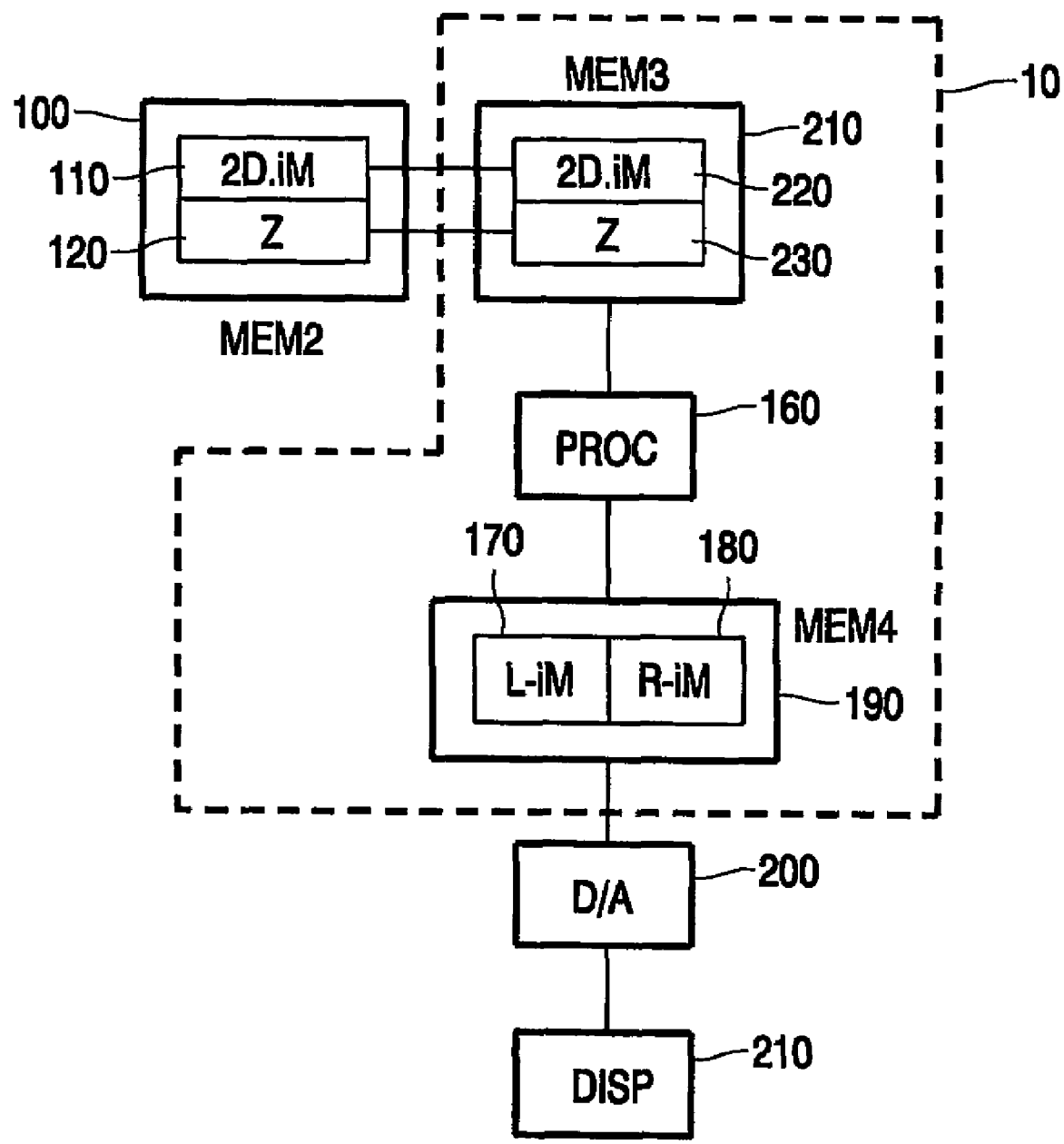
FIG. 1 shows a block diagram of a conventional system incorporating an image processing system.

To explain the system according to the invention, with reference to FIGS. 1 to 4, depth dependent transformation will be described. In this general description a pixel is regarded as a point (dimensionless). FIG. 1 shows a block diagram of a conventional system in which the image processing system according to the invention may advantageously be used. The conventional system comprises a memory 100, such as a graphics memory, for storing a 2D input image 110. The input image 110 is comprised of an array of pixels divided in rows and columns. For each pixel a pixel value is given. Various ways of representing a pixel value are well known, such as an RGB (Red, Green, Blue) or YUV coding. The pixel value may be stored in full, e.g. using 16 or 24 bits per pixel. Alternatively, a Color Look-Up Table (CLUT) scheme may be used to code the pixel value using fewer bits, e.g. 8 bits. In addition to the pixel value, for each pixel a depth value is stored in the memory 100 as the input depth 120. The depth value may, for instance, be stored using 16 bits per pixel. If required, a separate memory may be used for storing the input depth 120. The input image 110 and the input depth 120 may be generated in any suitable way. As an example, two cameras located at different positions may be used, preferably each representing a different eye. From the two 2D-images obtained by the cameras, one image plus depth information can be formed. The depth information can then be supplied in addition to and, preferably, compatible with the conventional supply of only one 2D image, allowing the scene to be observed using either a conventional 2D display system or a stereoscopic display system. On a game computer or personal computer the input image 110 and the input depth 120 are usually generated by a 3D-rendering process which derives the information from a 3D model stored in a memory. Typically, the memory is part of the main memory of the computer. Communication means, such a telecommunication means, audio/video broadcasting or a cable network, may be used to supply the input image 110 and the input depth 120 to the image processing system.

A processor 160 uses the input image 110 and the input depth 120 to generate at least one output image. In the example shown in FIG. 1, a left image 170 and a right image 180 are generated. The left image 170 represents a 2D representation of the 3D scene as observed from an observation point coinciding with the left eye of an observer. Similarly, the right image 180 represents a 2D representation of the 3D scene as observed from an observation point coinciding with the right eye of an observer. The processor 160 may build the output images in a memory 190, such as a graphics memory. The system according to the invention enables processing per pixel row, reducing the memory requirements. The memories can therefore be formed using line buffers for storing only one scan line of an image. As such, the image data can be processed as stream. If vertical filtering is applied, a few rows need to be stored. Usually a D/A converter 200 presents the output images on a suitable display 210, such as a stereoscopic display. In a broadcast receiver, the processor 160 may operate on the input image and input depth time-synchronized at pixel level to the supply of this information. The synchronization may be loosened by using a memory 210 for storing an input image 220 and input depth 230, being a respective copy of the input image 110 and input depth 120. The processor 160 then operates on the input image 220 and input depth 230, independent from the supply of the input image 110 and input depth 120. At suitable moments, e.g. when a complete new image has been created, the input image 110 and the input depth 120 are copied to the respective input image 220 and input depth 230. In a situation where the memory 100 and the memory 210 are physically combined in one memory block, the copying may be performed without physically copying the data, for instance by reassigning pointer registers. It will be appreciated that instead for maintaining a full image copy also a few pixels of a row or a few rows may be stored depending on the filter being applied.

The depth dependent transformation of the input image into the output image is associated with displacements of 3D objects relative to each other. The transformation described here is also referred as a parallactic transformation. The displacements occur as a consequence of, e.g., a change in the location of the observer relative to the scene, a change in the orientation of the observer relative to the scene, changing positions of the objects relative to each other due to their relative velocities, or a combination of these changes.

Figures 2A, 2B:
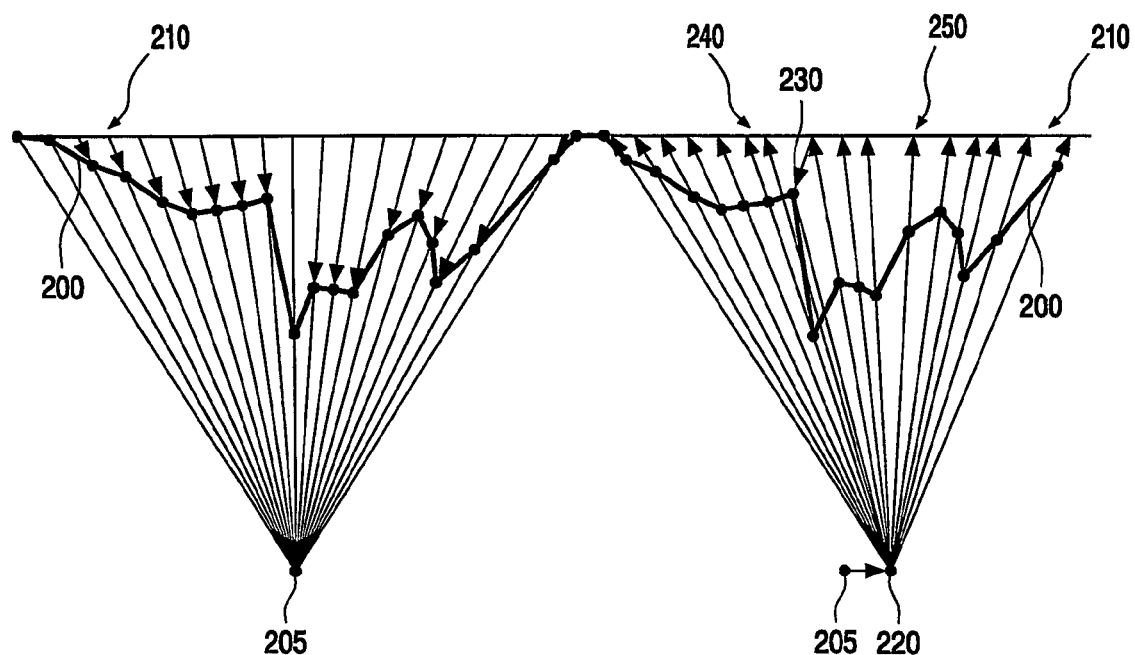
FIGS. 2A-2B show a terrain viewed form different viewpoints.

FIG. 2A shows a terrain 200 seen from a camera viewpoint 205 and projected on an image plane 210. Normally, the image plane is formed by uniform pixels (with possibly a different density in x and y direction). In this example, for each pixel of the image plain the corresponding texel (texture element) of the terrain is determined (intersection of the ray from the camera to the pixel through the terrain). Depth may be represented in any suitable form (e.g. representing a length from the texel to the pixel, distance of texel to camera, distance of texel to projection plane, etc). The depth may also be coded in any suitable form, for instance, a 16-bit encoding on a linear scale may be used, where the depth of an object with minimum allowed depth is encoded as 0000H (hexadecimal) and the depth of an object with maximum allowed depth is encoded as FFFFH. Persons skilled in the art will be able to select appropriate other representations, if so desired. FIG. 2B illustrates what happens if the same terrain is viewed from a viewpoint 220. As will be clear, occlusion 230 (texel is no longer visible), minification 240 and magnification 250 may occur. The same holds if the original object was not a terrain but true 3D objects.

Figure 3A:
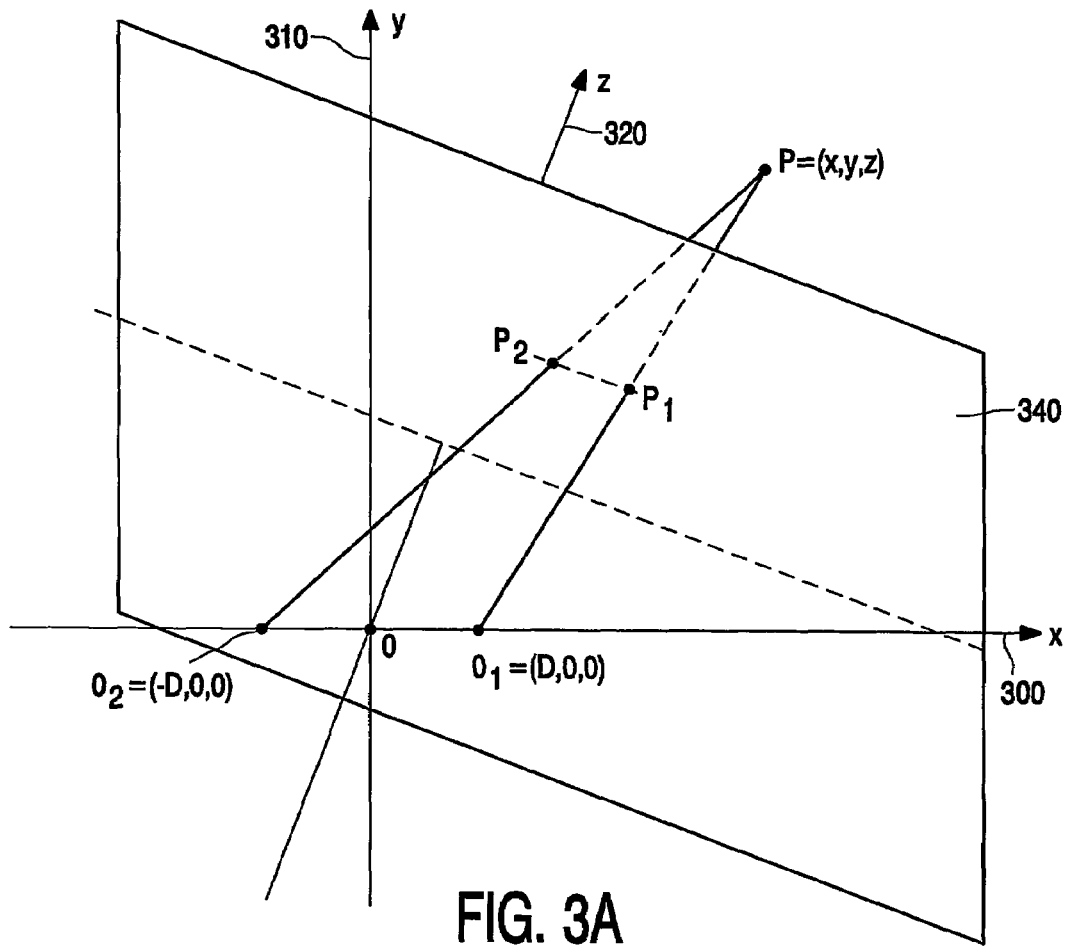
FIGS. 3A-3C show a perspective projection.

FIG. 3A shows a perspective projection. Shown is a 3D-coordinate system with an x-axis 300, y-axis 310 and a z-axis 320. A 2D image is comprised of an array of discrete pixels arranged in rows and columns. Pixels in this context are the smallest entities considered by the image processing according to the invention. Each respective pixel of a specific row in the image can assume only a respective one of a series of discrete positions. Each row of pixels in an image runs parallel to the x-axis 300, so that individual pixels in a row are discriminated on the basis of their respective x-coordinates. Each column of pixels runs parallel to the y-axis 310 that points in a direction perpendicular to the x-axis 300. The depth of the scene is measured along the z-axis 320, which runs perpendicular to both the x-axis 300 and the y-axis 310. A respective z-value is assigned to each particular pixel in order to represent the depth of the scenery for that particular pixel. For explaining the parallactic shifting of pixels, the origin O=(0, 0, 0) and the orientation of the co-ordinate system are chosen such that a 3D-object, represented by the point P=(x, y, z) is observed from the observation point $O_1$=(D, 0, 0). The plane $z=z_p$ is chosen to be the focus plane 240 (the plane on which the eyes of the observer focus). Usually, the plane of the display is chosen to coincide with the focus plane. The 2D image observed from the observation point $O_1$ is formed by a projection of the 3D objects on the focus plane, which is also referred to as the projection plane. The point P is projected onto $P_1=(x_p, y_p, z_p)$.

Figure 3B:
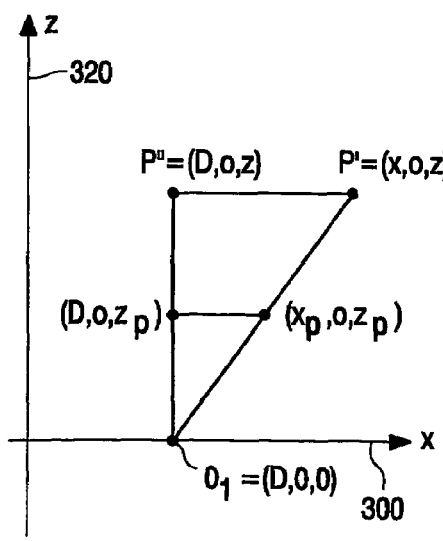

FIG. 3B shows a projection of FIG. 3A onto the plane y=0. P is projected onto P'=(x, 0, z); P'''=(D, 0, z). From the triangle $O_1$, P', P''' it follows that: $z_p/z=(x_p-D)/(x-D)$, giving $x_p=D+(x-D)\cdot z_p/z$.

Figure 3C:
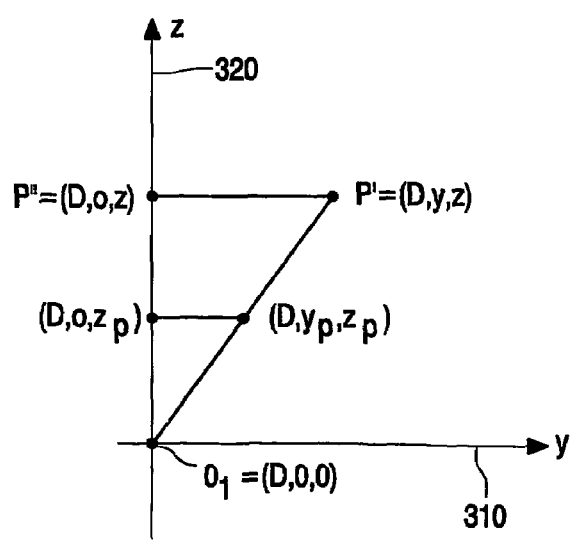

FIG. 3C shows a projection of FIG. 3A onto the plane x=D. P is projected onto P'=(D, y, z); P'''=(D, 0, z). From the triangle $O_1$, P', P''' it follows that: $z_p/z=y_p/y$, giving $y_p=y\cdot z_p/z$.

This gives that $P_1=D+(x-D)\cdot z_p/z, y\cdot z_p/z, z_p)$. Similarly, $P_2=(-D+(x+D)\cdot z_p z, y\cdot z_p/z, z_p)$. Similar formulas are given in [IEEE Computer graphics & Applications, Tutorial: Time-Multiplexed Stereoscopic Computer Graphics, March 1992]. From the formulas, it follows that by choosing the x-axis to be parallel to the line through the observation points, the y coordinates of $P_1$ and $P_2$ are the same. So, when deriving an image observed from $O_2$ from the image observed from $O_1$, no vertical parallax occurs. In general, by choosing the x-axis in this way the calculation of the parallax is simplified. The pixels of the output image can be derived from the input image. Assuming that the input image corresponds with the image as observed from $O_1$ and the output image corresponds with the image as observed from $O_2$. Assuming further that for input pixel $p_i=(x_i, y_i)$ the pixel value is given, as well as the depth $z_i$ of the 3D point $P(x, y_i, z_i)$ from which $p_i$ is derived. The corresponding output pixel $p_o=(x_o, y_o)$, with $y_o=y_i$, is related to the same 3D point $P(x, y_i, z_i)$. This gives:

$$x_i = D + (x-D) \cdot z_p/z_i, \text{ and}$$

$$x_o = -D + (x+D) \cdot z_p/z_i.$$

This implies that $x_o$ can be derived from $x_i$ in the following way: $x_o = x_i - 2D + 2D \cdot z_p/z_i = x_i + 2D(z_p/z_i - 1)$. The output image can, therefore, be derived from the input image by performing a horizontal shift d (only in the x-direction) of:

$$d = 2D(z_p/z - 1). \tag{1}$$

From this formula it can be observed that the shift is proportional to the inverse of the depth. In the formula, 2D corresponds to the offset between the observation points $O_1$ and $O_2$. This also corresponds to the parallax in the furthest allowed point ($z=\infty$).

Figure 4A:
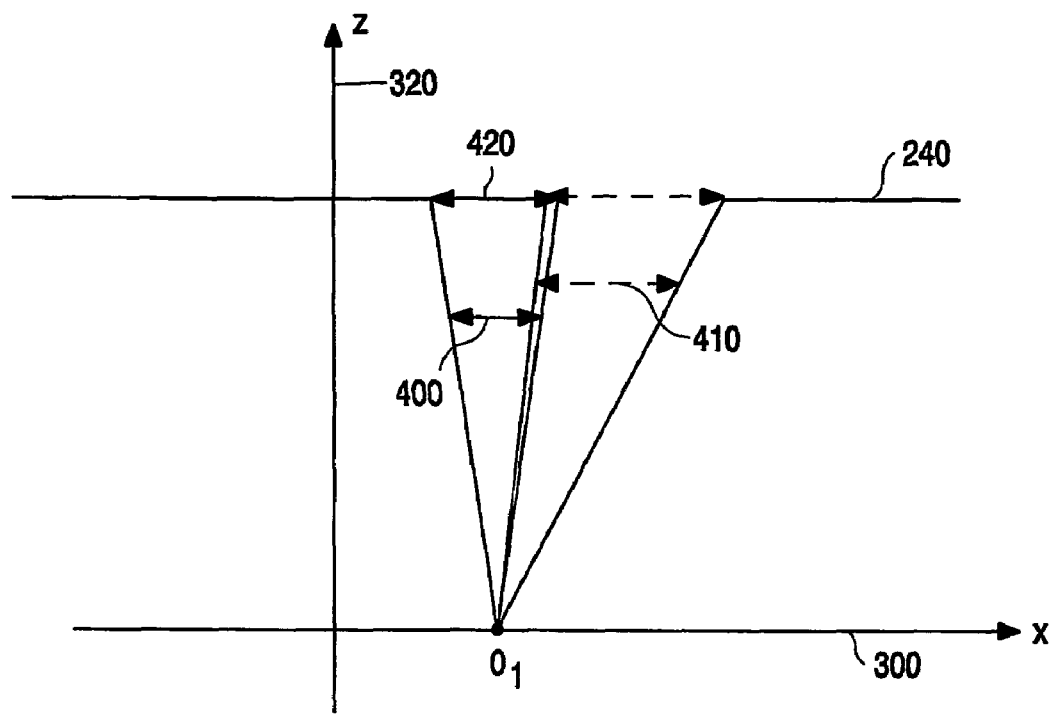
FIGS. 4A-4B illustrate increased overlapping of objects when observed from a different position.
Figure 4B:
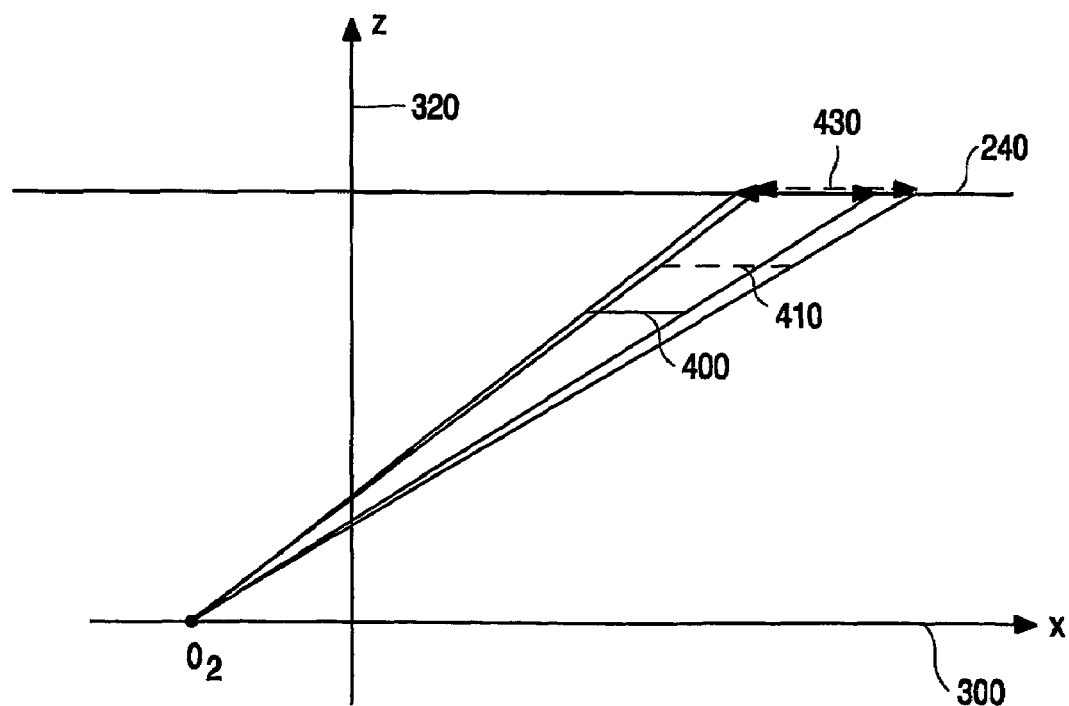

FIG. 4A shows a scene observed from observation point $O_1$, corresponding to the input image, wherein a nearby object 400 is partially overlapping a further removed object 410. For clarity, the y-coordinates are not shown in the figure. Due to the overlapping, the input image comprises all pixels of object 400 and only some of pixels 410, as illustrated by the observed image 420. FIG. 4B shows the same scene observed from observation point $O_2$, which corresponds to the output image. As is clear from FIG. 4B the overlap has increased. If the output image 430 of FIG. 4B is derived from the input image 420 of FIG. 4A, this increased overlap will be reflected by an input pixel corresponding to the background object 410 partly or totally being occluded by an input pixel corresponding to the foreground object 300. Since the footprints of a reconstructed pixel do have a size, the overlap can be partial. In the areas of overlap there are several candidates for the pixel values in the output image. The system according to the invention uses a reconstruction filter to determine for the output pixel locations (i.e. according to the grid of the output image) the input pixel(s) that after transformation partly or wholly overlap the output pixel location.

Figure 5A:
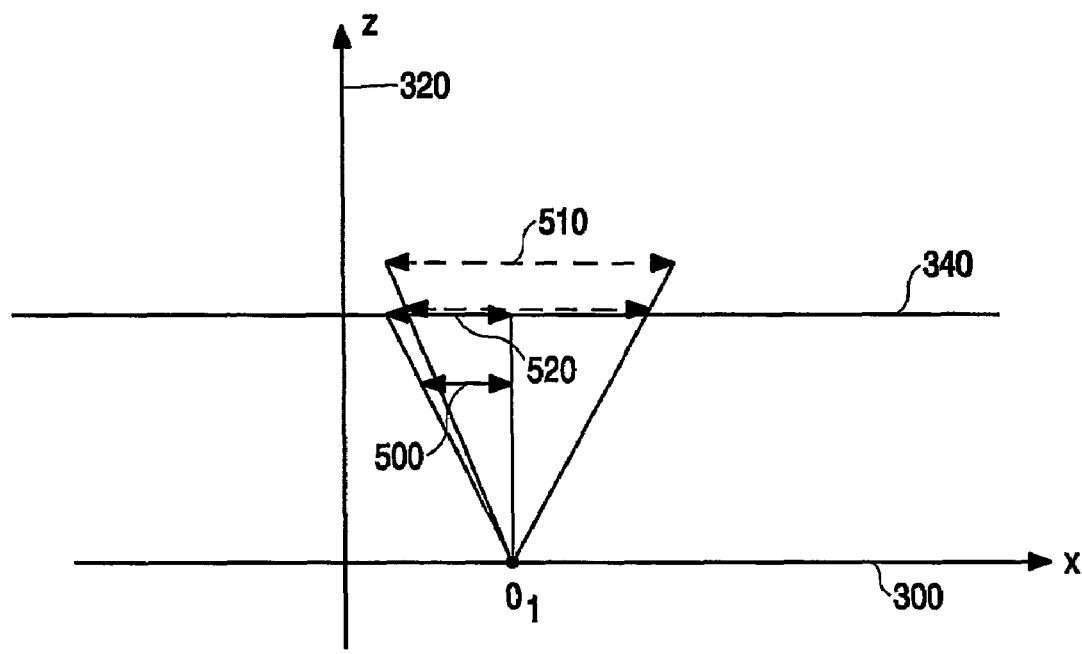
FIGS. 5A-5B illustrate the appearance of a hole when objects are observed from a different position, FIG. 6 further illustrates projection onto a plane.
Figure 5B:
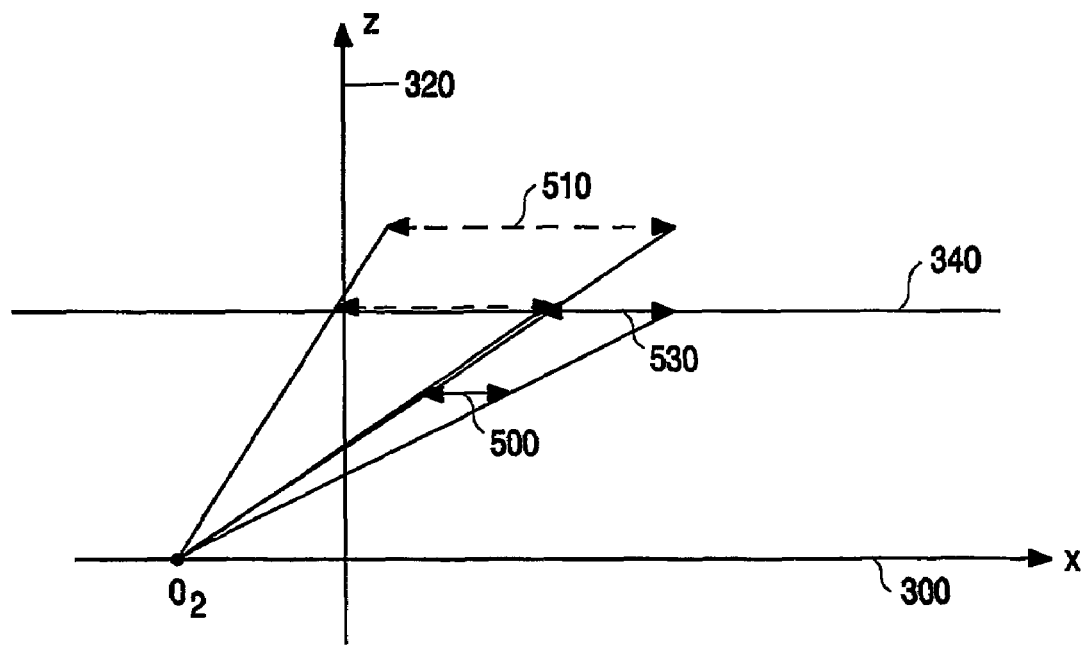

In contrast to different pixels of the input image being shifted to the same output pixel position, FIG. 5 shows an example wherein a 'hole' occurs in the output image 530 due to the fact that no input pixel is present to fill a position in the output image 530. FIG. 5A shows that in the input image 520 a background object 510 is at least partly obscured by a foreground 500. In FIG. 5B no overlap (or a smaller overlap) occurs between the objects 500 and 510 as represented in the output image 530, observed from the observation point $O_2$.

For high quality re-rendering from different viewpoints for use in, particularly, broadcast televisions system, it is desired to perform the following four steps:

1. Reconstruct a continuous signal from the sampled terrain data

2. Deform the continuous signal to the desired viewpoints.

3. Band limit the deformed signal

4. Sample the band limited signal

All four steps of the resampling procedure can be performed by using texel splatting, but avoiding the use of a fragment buffer, thereby improving the image quality at low cost. The cost, in terms of rendering time, or extra silicon needed, of the integrated pre-filtering (Step 3) is proportional to the size of the pre-filter footprint times the length of the output image. Steps 1 and 2 will be combined in the reconstruction filtering operation as described in more detail below. The described reconstruction filtering operations support higher order video filtering while re-sampling the original image based on view point transformation. For this operation it is desired to be able to detect occlusion of pixel. The system according to the invention uses an effective way to detect occlusions. This detection method may be used in combination with the reconstruction filtering, but may also be used in other video processing systems. Steps 3 and 4 will be performed using pre-filtering.

Detection of Occlusions

Figure 6:
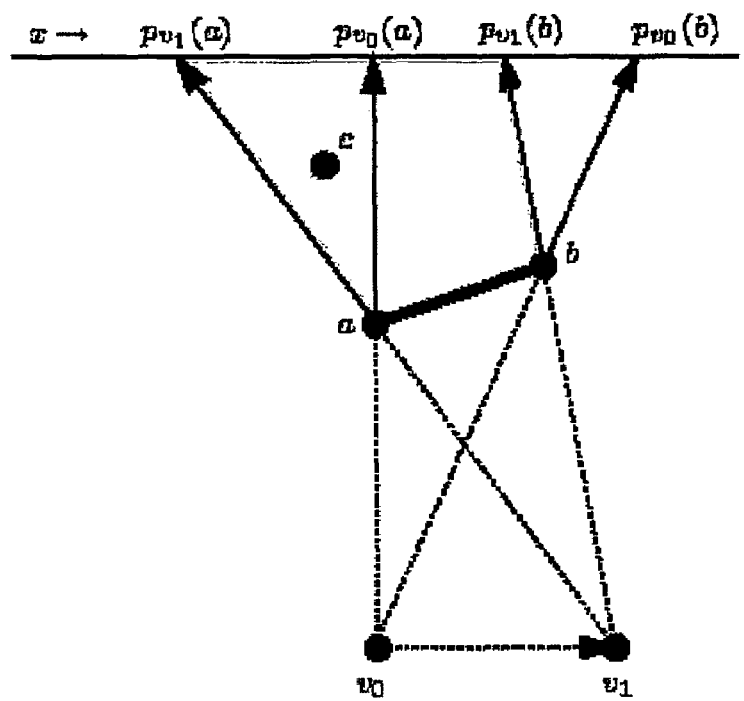
Figure 7:
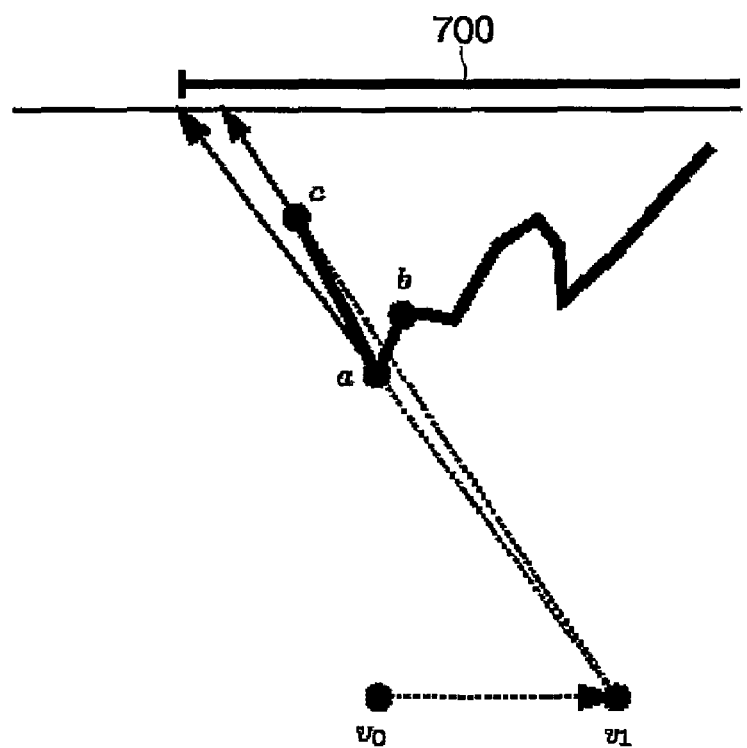
FIG. 7 illustrates detection of occlusions.

The occlusion detection according to the invention is designed for the special case of a horizontal camera translation (the transformation that supports the horizontal parallax of 3D television), where deformation of the input image is constrained to be horizontal. This allows processing of the input image in scanline order. The detection is described in more detail for the '1.5D' problem of projecting a one dimensional piecewise linear terrain onto an image line from various viewpoints. The one dimensional terrain is derived from a scanline of the input image together with the corresponding depth values. According to the invention, occlusions can be determined on the fly during a traversal of this scanline. FIG. 6 shows the projection $p_v(a)$ of an input sample point a for viewpoint v onto the image line. The original camera viewpoint is indicated by $v_0$. A relation between scanline order and occlusions for other viewpoints can be expressed as follows: assuming that a, b are subsequent samples on an input scanline of a depth terrain for original camera position $v_0$, such that $p_{v_0}(a) < p_{v_0}(b)$ and that $v_1 > v_0$ is the desired camera viewpoint, then for a sample point c that is occluded by line segment (a; b) from viewpoint v1 it holds that $p_{v_0}(c) < p_{v_0}(a)$. In order for line segment (a; b) to be visible from viewpoint $v_1$, $v_1$ needs to be on the same side of the line the line supported by (a; b) as $v_0$. Consequently, $p_{v_1}(a) < p_{v_1}(b)$. From the occlusion of c, it follows that $p_{v_1}(a) < p_{v_1}(c) < p_{v_1}(b)$. By construction, c is visible from viewpoint $v_0$, so either $p_{v_0}(c) < p_{v_0}(a)$), or $p_{v_0}(c) > p_{v_0}(b)$). Since $v_1 > v_0$, $p_{v_1}(b) < p_{v_0}(b)$, which implies that $p_{v_0}(c) > p_{v_0}(b)$ cannot hold. Thus indeed that $p_{v_0}(c) < p_{v_0}(a)$. From this it follows that for a desired viewpoint $v_1 > v_0$, a traversal of the input scanline with decreasing x-coordinate, will let us encounter occluding parts of the terrain before occluded parts. Therefore, occlusions can be solved as follows, as illustrated in FIG. 7. First, a variable is introduced that maintains the x-extent 700 of the projected pixels in the output domain. Then, it can be concluded that if a pixel that is transformed does not lengthen the extent, it must be occluded by the previously processed pixels. For a viewpoint transformations $v_1 < v_0$, the argument is analogous: in that case the scanline is traversed with increasing x-coordinate.

Reconstruction Filter

Figure 8:
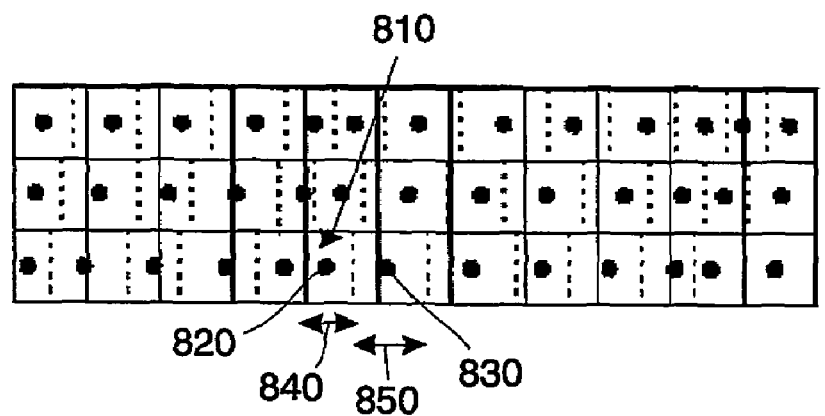
FIG. 8 shows the reconstruction filtering.

In a preferred embodiment, texture mapping is performed in two stages. The first stage is an integration of Step 1 and 2 of the resampling process. The first stage uses a reconstruction filter. The footprint of the reconstruction filter may be a box. This is illustrated in FIG. 7. This figure shows a grid of output pixels. Each output pixel is shown as a rectangle representing the image surface covered by the pixel. In a preferred embodiment, such a rectangle forms the basis of the box used for the reconstruction filtering. It will be appreciated that also other footprints may be used then those matching the surface of one pixel, e.g. different shapes, covering more then one pixel (higher order filtering), etc. According to the invention, the footprints of the input pixels are taken and transformed. This does not only change the position but also the size of these input footprints. The size and location of an exemplary transformation are shown as the rectangles with dashed lines in FIG. 8. The solid dots illustrate the location the dimensionless input pixel coordinate (typically coinciding with the middle of the input pixel footprint) after the transformation. As part of the transformation, the size of the box in the output domain is computed. It is dependent on the density of the projected pixels onto the image line. In a simple embodiment, during the reconstruction filtering, input pixels that appear to be occluded during the terrain traversal are dropped and not reconstructed. In a preferred embodiment, a more refined reconstruction is used, particularly a contribution proportional to the non-occluded part of the first order reconstructed pixel of the image. FIG. 8 shows the result of the box reconstruction and occlusion handling. The size of the boxes is a measure for the contribution of the original pixel. For example, the reconstructed footprint of input pixel 820 (i.e. the footprint after transformation) is indicated by the segment 840. In this example, the reconstructed footprint is approximately 75% of the footprint of the output pixels. In this case, the contribution of input pixel to the output image is set to a factor of 0.75. The reconstructed footprint of input pixel 830 falls partly in output pixel 810 and partly in the output pixel to the right of 810. The reconstructed footprint of input pixel 830 is roughly 25% of the footprint of output pixel 810 and roughly 75% of the footprint of the neighboring output pixel. The total contribution of input pixel 830 is the 25%+75%. Consequently, input pixel 830 is multiplied by a factor of 1.

Pre-Filter

Figure 9:
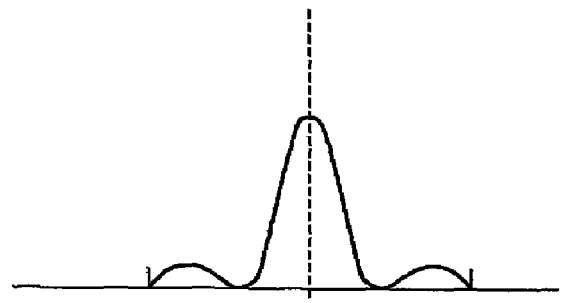
FIG. 9 shows a pre-filter shape.

The second stage is to perform Step 3 and 4 of the resampling framework, using a pre-filter before rendering the output image. Each output pixel is filtered using a pre-filter footprint. In a preferred embodiment, this footprint extends over several pixels. The filter may only extend horizontally. FIG. 9 shows a shape of a filter extending three pixels, centered on the pixel to which it belongs and covering two neighboring pixels. In a preferred embodiment, the pre-filter footprint also extends vertically. Using a similar shape as shown in FIG. 9, the pre-filter footprint of an output pixel covers eight neighboring pixels. It will be appreciated that any suitable shape and footprint extent may be used.

Figure 10:
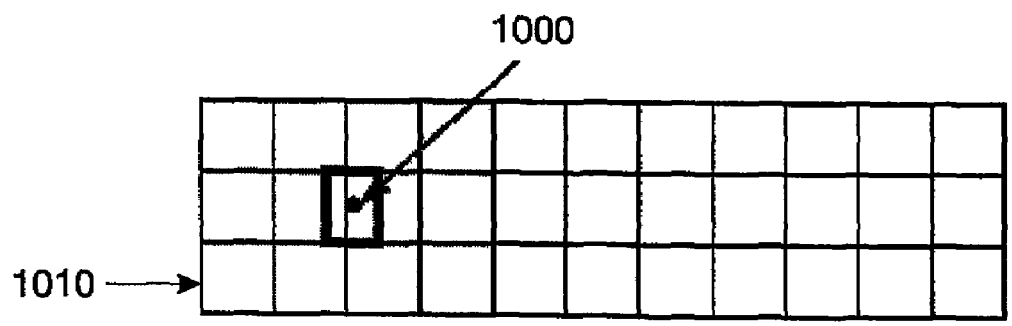
FIG. 10 shows the texel splatting performed by the pre-filter.

As illustrated in FIG. 10, the contribution of an input pixel 1000 is then splat to (i.e. distributed over) pixels of which the pre-filter footprint overlap with the reconstructed box in the output domain. The reconstructed box of pixel 1000 is shown with the highlighted rectangle 1010. In this case, twelve output pixels receive a contribution. For each of those output pixels the contribution is determined by using the shape of their respective pre-filter to weigh the input pixel value. As described above, it is possible to splat in input pixel only to output pixels on the same scanline. Preferably, also vertical filtering is performed to improve picture quality even more.

Figure 11:
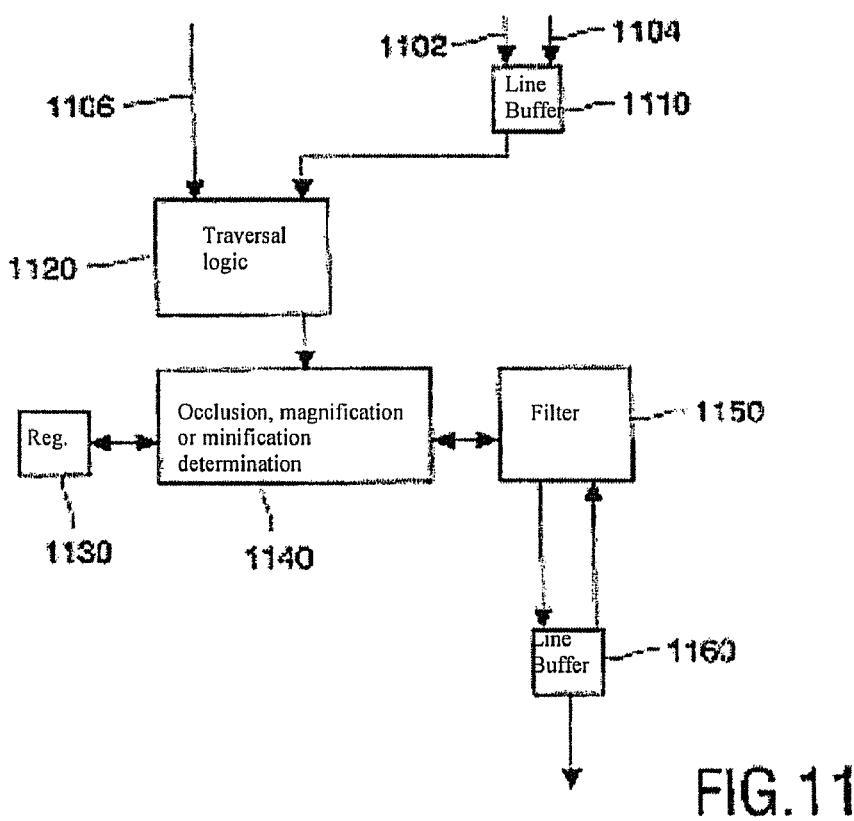
FIG. 11 shows a block diagram of a preferred embodiment.

FIG. 11 shows a schematic hardware layout of the preferred embodiment. The input image is received as a sequence of pixels with a color value 1102 and depth 1104, and stored in a line buffer 1110. This image is recorded from a viewpoint $v_0$. Also the new viewpoint x-coordinate $v_1$ 1106 is received. Block 1120 shows traversal logic that performs the transformation of the input pixels (and their footprint), by computing $p_{v_1}(x)$. The extent of the transformation is stored in a register 1130. Block 1140 determines whether there is occlusion, magnification or minification:

$p_{v_1}(x)$<extent→occlusion $p_{v_1}(x)$>extent+1→magnification else→minification Block 1150 shows the filter (reconstruction filter and pre-filter). The filtered signal is stored in an output line buffer 1160 before being rendered. It will be appreciated that the functionality of blocks 1120, 1140 and 1150 may also be performed by a programmable (video) processor, such as a DSP.

'Hole' Artifacts

When rendering an input image that is supplied as an 'image+depth' (2.5D) data from a slightly different virtual camera position, it can occur that to certain output pixels no input data is transformed (de-occlusion). In principle, such hole artifacts can be removed by substituting a pixel value obtained through interpolation of the horizontally (and/or vertically) neighboring pixel values that are available left and right of the hole. As a simple alternative, the value is substituted of the available neighboring pixel with the greatest z-value. Such a substitution matches real life experience when the observer watches a background object emerging from behind a foreground object. The texel splatting performed by the pre-filter, as described above, is an advanced way of performing such an interpolation. It will be appreciated that if a hole is too large, interpolation may not give good results. Large holes can appear at depth boundaries with a significant change in depth. To fill such a hole during rendering, it is desired to have information from spatial locations which are not observed in the current input image, but may be visible from another observation point (e.g. a second camera).

In itself, it is known to transmit extra data which contains information on these hidden parts. One known way of doing this is to represent a moving image using several layers, where each layer stores objects with matching motion fields. The objects and the layers are computed from the optic flow in moving images. The layers are accumulated over multiple frames. An object that is completely or largely occluded will in general fully be represented in one of the deeper layers. Nelson L. Chang and Avideh Zakhor "View generation for three-dimensional scenes from video sequences", 1997, IEEE Transactions on Image Processing, vol 6, p. 584-598 describes a scene in terms of multiple levels, based on a certain reference frame. The first level is the visible part in the reference frame. Level 1 thus includes all nearby objects but also all visible parts of further removed objects. In general, level k consists of those pixels which are occluded k−1 times for the reference image (i.e. from the viewpoint of the reference image). Compared to a conventional layered approach, it is claimed that with this approach, 3 levels are usually sufficient. The layers are constructed from independently computed three dimensional models corresponding to the multiple views. In this latter approach, the amount of redundant information is significantly reduced. In the remainder, an efficient method is described for generating such a hidden layer, also in the case where no full 3-dimensional objects are available, and an efficient method for rendering an image from a different viewpoint, even if only depth ordering information is present. The generation method according to the invention is preferably combined with the layering of Chang. This layering will not be described further, but is hereby included by reference.

Figure 12A:
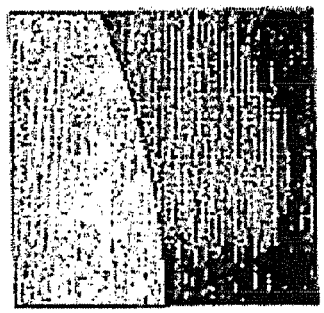
FIG. 12 shows an output image compiled from two input images recorded from different viewpoints.
Figure 12B:
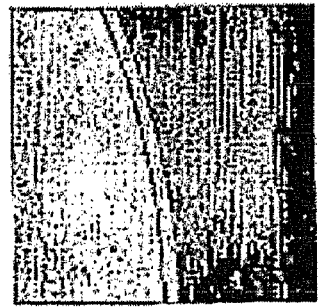
Figure 12C:
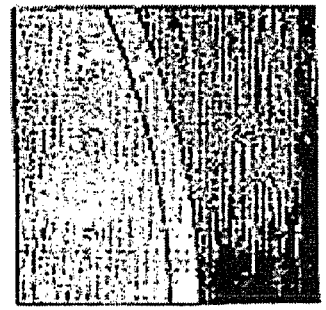

FIG. 12 illustrates the method according to the invention for an exemplary set-up where images are recorded using a stereo camera. The left camera provides the base image (FIG. 12A), and the right camera provides an image from a secondary view point (FIG. 12C). It will be appreciated that also other methods may be used to retrieve the additional image. In principle, the base image is transmitted. It is desired to be able to render an image (FIG. 12B) from a different view point, e.g. a viewpoint in between the two original view points. Most of the pixels to be shown can be taken from the base (left) image (the light and dark parts of the image), however, the middle part 1210 is not seen in the base image and has to be taken from the secondary (right) image. However, the additional image is not fully transmitted to reduce transmission bandwidth and reduce processing in the rendering device. Instead, as illustrated in FIG. 13, a base image (FIG. 13A) and a per-pixel depth map (FIG. 13B) is transmitted (image+depth, '2.5D'). To render an image from a new point, again the majority of the pixels can be taken from the base image. However, there is now no secondary image from which the hole can be filled. Thus a hole 1310 occurs in the rendered image (FIG. 13C) because parts of the scene visible in the middle image are occluded in the base image. As indicate above, additional layers can be used which contains the information which is hidden by the foreground objects in the base image. In that way, it is still possible to use the image+depth representation of the base image, but the additional information guarantees that the holes can be filled as is illustrated in FIG. 14. FIGS. 14A and B correspond to FIGS. 13A and B, respectively. FIGS. 14C and D give the pixel values and depths, respectively, for the hidden layer. FIG. 14E corresponds to FIG. 13C where the hole 1310 is now filled using the information from the hidden layer.

Generating the Hidden Layer

Figure 15A:
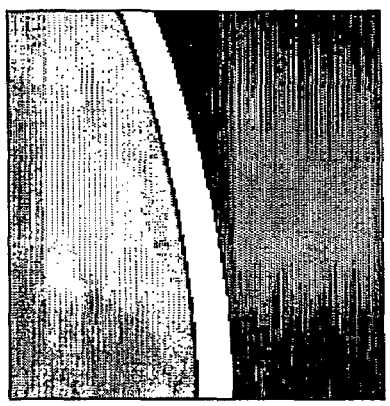
FIG. 15 shows motion compensation of the first image.
Figure 15B:
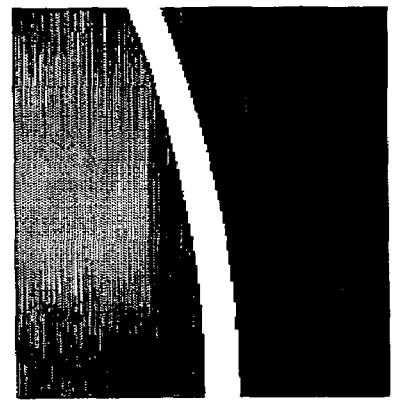
Figure 16A:
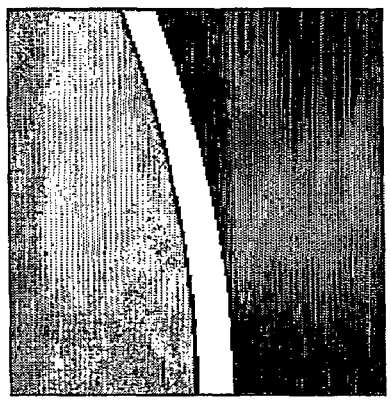
FIG. 16 shows generation of the depth values for the hidden layer.
Figure 16B:
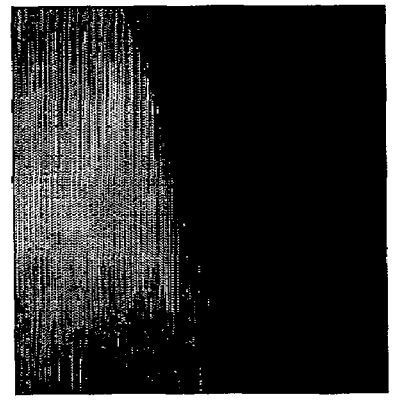
Figure 17A:
FIG. 17 shows motion compensation of the hidden layer to the coordinates of the base input image.
Figure 17B:
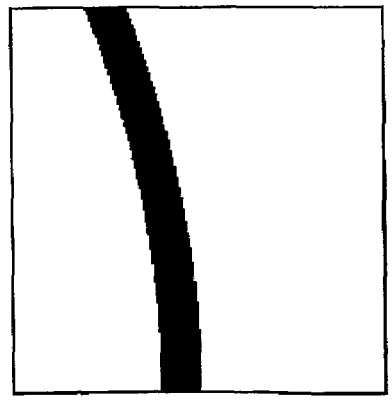

Two of the basic steps in 2D-to-3D conversion of video data are segmentation and motion estimation. The motion per segment can in a subsequent stage be used for depth through structure-from-motion or depth ordering through dynamic occlusion. The analysis process is illustrated in FIGS. 15, 16 and 17. For illustration purposes, it is assumed that all segments move in horizontal directions only. First a segmentation of the original image is computed and a motion estimation from original to the matched image is performed. In principle, segmentation and motion estimation are well-known and will not be described in detail here. During this operation, in principle for each pixel in the base image of FIG. 12A it is checked whether this pixel can be found in the additional image of FIG. 12C. If so, a motion vector is determined. Instead of performing such an operation per pixel it may also be performed per segment of similar depth.

Next, the base image is motion compensated towards the camera position of the additional image. This amounts to shifting the segments over their computed motion vector, as is illustrated in FIG. 15. To simplify matters, the motion vector may be rounded to an integer motion. To increase accuracy, a linear interpolation scheme may be used. Assuming that the base image corresponds to the left eye, this gives us a predicted right image, a predicted segment map and a predicted depth map (if camera parameters are available) or motion field. It will be appreciated that for the depth dependent transformation in general depth and motion are equivalent. It can now be concluded that some pixels do not have a predicted segment assigned to them. Those are the pixels which are de-occluded. Preferably, subsequent de-occluded pixels on the same scan line are grouped together in pseudo-segments.

Next a depth value is assigned to the pseudo-segment (or to the individual pixels of the pseudo-segment). Preferably, the depth is based on the depth value of the two neighboring, non-occluded pixels are determined: on the left side and on the right side. Advantageously, the depth or motion vector of the non-occluded neighboring segment/pixel which has the largest depth is assigned to the occluded pseudo-segment. Note that this requires only knowledge of the depth ordering.

It will be appreciated that pseudo segments at the boundaries can be assigned the depth value of their single neighbor. In this way, the background segment is extended to the de-occluded pixels (i.e., give the de-occluded pixels the depth of the background segment), as is shown in FIG. 16.

In a preferred embodiment, to mitigate noise effects, the regions of the de-occluded pixels are first eroded and then dilated by one pixel (morphological filter). In this way, individual pixels with an erroneous depth value that result in the pixels appearing to be de-occluded are corrected.

Now for the really de-occluded pixels a depth value is known. The locations of these pixels are known with reference to the additional image. Preferably, an inverse motion compensation takes place for these de-occluded pixels, following the same methodology as described above. In this way, the de-occluded pixels are motion-compensated towards to the camera position of the base image to generate the hidden layer and the hidden depth map, as is shown in FIG. 17. As a consequence, a hidden layer is now created with the de-occluded pixels having a position with reference to the first image, together with a depth or motion vector. By representing the hidden layer from the viewpoint of the first image, the transformation used for converting the first image to an output image from a selectable viewpoint can also be applied to the hidden layer to generate the de-occluded pixels from that new viewpoint. The output image from the selected viewpoint may differ from the viewpoint of the additional image of FIG. 12C.

It may occur that the de-occluded pixel after inverse motion compensation is not in the range of the original image (outside its borders). In such a case, a look-up table may be created to store the data of the de-occluded pixel at an unoccupied position in the hidden layer. Finally, if the de-occluded pixel is not in the range of the original image (outside its borders), we may generate a look-up table and store the data of the de-occluded pixel at an unoccupied position in the hidden layer. The look-up table maintains the mapping.

It will be appreciated that the hidden layer in general contains relative few pixels compared to the base image. Instead of transmitting the hidden layer as a full image, preferably the hidden layer is compressed using any suitable technique, such as run-length coding. Using such a coding scheme also the boundary of the base image with de-occluded pixels may be included with co-ordinates outside the base image.

It will be appreciated that although the method is described for a fixed stereo camera where the base image is recorded with the left camera and the additional image with the right camera, the same technique can be applied for other situations as well. For example, it is possible to apply the technique to scenes with a moving camera. This essentially generates a hidden layer containing all the scene information which is not present in the original image but which is present in the matched image (in this case motion estimation is not between two simultaneously recorded images from a different viewpoint, but between time-sequential images). The motion is then at least partially caused by the motion of the camera. Similarly, depth information can be derived from moving objects base on the time sequence of images.

It will also be appreciated that although the invention is described for a horizontal movement the same technique can also be applied for vertical or arbitrary movement.

Rendering Additional Images

The basic process for rendering additional images is preferably executed similar to the rendering of the first layer of the base image. As described above, rendering from another viewpoint can be seen as resampling the original image to the sampling grid imposed by the projection from the desired viewpoint. As described above, after viewpoint transformation, the density of the projected input pixels is not uniform in the output domain. Hence, a resampling procedure is required. During the resampling procedure, regions of the original image are encountered that are minified, or occluded, and regions that are magnified, or de-occluded. In the remainder a description is given of a preferred method to render the regions that are magnified due to view point transformation. The magnified regions can be filled with input from the hidden layer. The described rendering method has graceful degradation, and can also support integration of higher order reconstruction video filters for rendering de-occluded area's in the desired viewpoint. In the remainder it is assumed that the features in the hidden layer are specified in the coordinate frame of the base layer, allows a simple way of integration of the rendering of the hidden layer within the rendering procedure for single layered 2.5 video sequences that has been described above. Persons skilled in the art will be able to adapt the method if the hidden layer is specified in a different way. In the description it is also assumed that the viewpoint of the rendered image is between those of the original and matched image, giving highest quality. In principle, the method can also be used if this is not the case. However, then the reconstruction filter plays a dominant role for the enlarged area's in the final image.

In the description it is also assumed that the new viewpoint is achieved by a horizontal translation of the camera. This implies that the resampling procedure only has to deal with horizontal parallax, and that each scanline of the image can be handled separately. In short, the rendering is process includes:

Traversing the input scanline in a single scan.

Maintaining the extent to which the output scanline is rendered in a single variable during the processing of the scanline; this extent increases monotonically, i.e., the renderer never has to re-render parts of the output scanline.

Computing the magnification factor per input-image pixel during the traversal of the scanline, Pixels that appear occluded can be dropped; the other pixels can be fed immediately to a FIR video filter block that pre-filters and samples the output scanline at screen resolution (resolution of the output image).

It can be noted that samples from the hidden layer are only necessary when there is a relatively large magnification factor. In the preferred embodiment, the threshold is set to a magnification factor of 1.5. For lower magnification factors, no information is retrieved from the hidden layer; for higher magnification factors, information (if available) is retrieved from the hidden layer.

In order to be able to efficiently fill in contributions from the hidden layer, it is preferred to interleave processing of the base image layer, and the hidden layer. For both scans, the extent in the output scanline is maintained. As described above, the extent is the 'furthest x-coordinate after trans formation'. The extent of the base image is referred to as base_extent; the extent of the hidden layer is referred to as the hidden_extent. In the following pseudo code, the variable 'extent' shows the furthest the transformation has come in the output image where this location is covered by either a pixel from the base image or from the hidden layer. In this way, only a single scan over the base image scanline is performed interleaved with a single scan over the hidden image scanline. The following pseudo-code shows the handling of the interleaved scans for a transformation from the camera viewpoint to a more left observation point of the output image.

```
RenderScanline:
▶Initialization
1. base_extent = 0;
2. hidden_extent = 0;
3. extent = 0;
▶Process scanline
4 until scanline finished
▶Find visible samples
4.1 while base_extent < extent
4.1.1 (output_base_x; base_luminance)=FetchNextSample(base_layer)
4.1.2 if output_base_x > base_extent
      base_extent ←output_x
4.2 while hidden_extent < extent
4.2.1 (output_hidden_x, hidden_luminance)=FetchNextSample(hidden_layer)
4.2.2 if output_hidden_x > hidden_extent
        hidden_extent ←output_x
Determine magnification
4.3 if base_extent < extent + 1.5
▶Render base layer
4.3.2 Render (output_base_x; base_luminance);
4.3.3 extent ←base_extent
4.4 else if hidden_extent < extent + 1.5
▶Render hidden layer
4.4.1 Render(output_hidden_x; hidden_luminance);
4.4.2 extent ←hidden_extent
4.5 else
4.5.1 Magnify
```

Above pseudo code shows the processing of one scan line. Step 4 deals with finding the next pixel of the base image that is not occlude after transformation. As long as the pixel is occluded (base_extent<extent), in step 4.1.1 the next pixel of the base image is taken, transformed and the transformed x-coordinate is assigned to the variable output_base_x. If this increases the base_extent, then the base_extent is adjusted in step 4.1.2. The loop of step 4.1 ends if a pixel is found that, after transformation, is not occluded. Steps 4.2 perform exactly the same operation for the hidden layer. So upon entering step 4.3 a pixel has been found in the base image and in the hidden layer that, after transformation, are not occluded. Now priority is given to render the pixel from the base image. As described above, such a pixel is only used if this does not create a too large hole. To this end, in step 4.3 it is checked whether the pixel, after transformation, lies within 1.5 pixel from the previously rendered pixel. If so, there is not a too big hole and in step 4.3.2 the pixel from the base image is rendered and in step 4.3.3 the overall extent variable is set to the new point (i.e. to the base_extent). If on the other hand, the hole would be more than 1.5 pixel wide, it is tested if the hidden layer has a good candidate (i.e. a pixel that lies less than 1.5 removed from the last rendered output pixel). If so, this pixel is taken in step 4.4.1 and the extent variable set to the value of the hidden_extent variable. If neither the base image nor the hidden layer has a good candidate, a magnification operation is required (e.g. using interpolation).

The description given above focuses on the usual situation where the transformation is horizontal only. Persons skilled in the art can easily apply the same concepts to vertical transformation. Transformation sin arbitrary directions can be done in two sequential passes (a horizontal and vertical pass). If so desired, these passes may be interleaved to reduce storage and bandwidth requirements.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in a claim. The invention can be implemented by means of hardware comprising several distinct elements, and by means of a suitably programmed computer. Where the system/device/apparatus claims enumerate several means, several of these means can be embodied by one and the same item of hardware. The computer program product may be stored/distributed on a suitable medium, such as optical storage, but may also be distributed in other forms, such as being distributed via the Internet or wireless telecommunication systems.

The invention claimed is:

1. An image processing system for generating at least one output image associated with an output viewpoint from an input image associated with an input viewpoint through a depth-dependent transformation; the images being represented as an input pixel array and output pixel array, respectively; the image processing system including:
   an input for receiving the input image, where the input image includes for each input pixel an associated input pixel value and input pixel depth, wherein a pixel being indicated by an x-coordinate and a y-coordinate; each input pixel being associated with a respective reconstruction filter footprint;
   a video processor operative to create output pixels of the output image by:
      for each input pixel, transforming the input pixel to a transformed input pixel as a function of the associated input pixel depth and transforming the associated filter footprint to an transformed filter footprint as a function of the associated input pixel depth; and
      performing a reconstruction filtering operation on a plurality of the transformed input pixels using the transformed filter footprints; and
   an output for providing the output image for subsequent rendering, wherein the video processor is operative to determine which transformed filter footprints are fully not-occluded and the video processor is operative to perform the reconstruction filtering operation based on fully not-occluded transformed filter footprints, wherein the video processor being operative to sequentially process input pixels of a row in a direction opposite from a displacement from the input viewpoint to the output viewpoint along the x-axis; the processing including: maintaining an x-coordinate extent that indicates for already processed input pixels with respect to a predetermined start position a furthest x-coordinate already occluded by at least one transformed input pixel, where the furthest x-coordinate is a highest x-coordinate if the processing direction is from left-to-right and a lowest x-coordinate if the processing direction is right-to-left; and determining that a transformed input pixel is occluded from the output viewpoint if processing of the associate input pixel does not result in increasing the x-coordinate extent.

2. An image processing system as claimed in claim 1, wherein the input is operative to receive a hidden image, where the hidden image includes for each hidden pixel an associated hidden pixel value and hidden pixel depth; the video processor being operative to determining whether or not an output pixel is de-occluded from the output viewpoint and for a de-occluded output pixel perform the reconstruction filtering on a transformed hidden image pixel.

3. An image processing system as claimed in claim 2, wherein the video processor is operative to determine that an output pixel is de-occluded if the transformed input pixel increases the x-coordinate extent by more than a predetermined threshold.

4. An image processing system as claimed in claim 1, wherein the video processor is operative to perform the reconstruction filtering operation using a box filter or a higher order filter.

* * * * *